Figure 1:
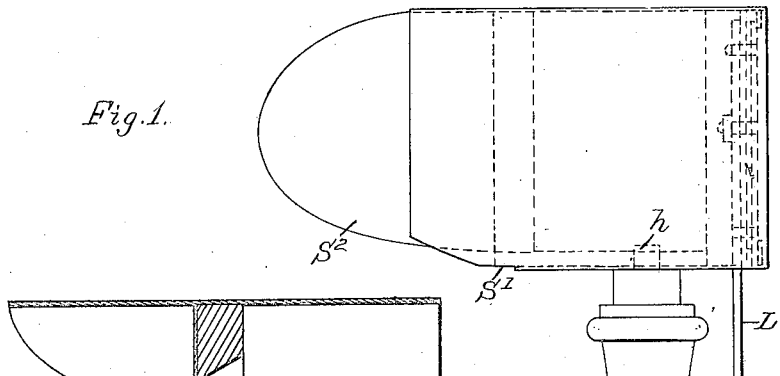

Jan. 2, 1923.

M. GIRSDANSKY.
STEREOSCOPE.
FILED MAY 29, 1919.

1,440,457

2 SHEETS-SHEET 1

Inventor
Max Girsdansky
by Edwin W. Hammer Att'y.

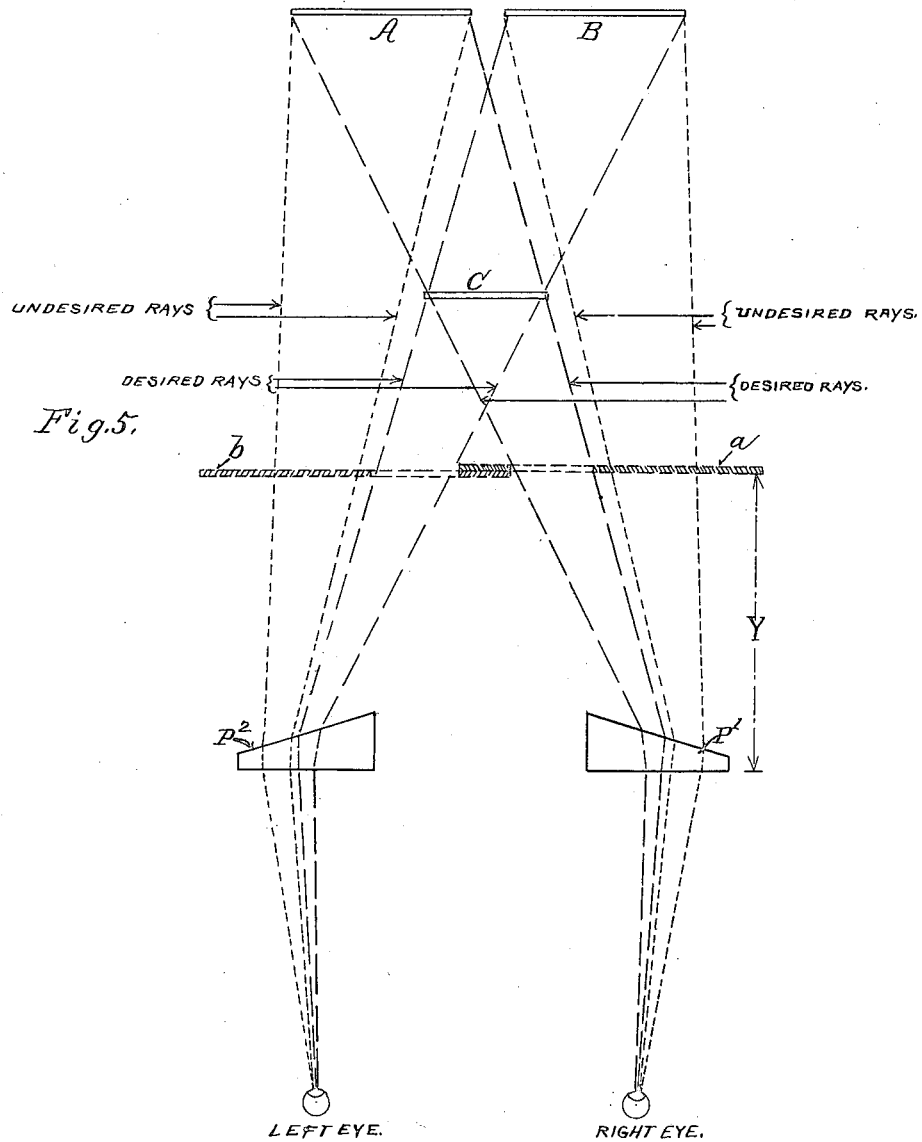

Patented Jan. 2, 1923.

1,440,457

UNITED STATES PATENT OFFICE.

MAX GIRSDANSKY, OF NEW YORK, N. Y.

STEREOSCOPE.

Application filed May 29, 1919. Serial No. 300,581.

*To all whom it may concern:*

Be it known that I, MAX GIRSDANSKY, a citizen of the United States, and a resident of the city of New York, in the county of New York and State of New York, have invented certain new and useful Improvements in Stereoscopes, of which the following is a specification, reference being had to the accompanying drawings, forming part thereof.
This invention relates to that form of optical instrument designed to obtain the well known stereoscopic effect, secured through the simultaneous viewing of two pictures taken from slightly different angles in such a manner that the two views are superposed and give the illusion of natural perspective or depth in the picture.

The stereoscopic effect, as such, has been known and has been securable for many years with apparatus readily obtained. Its mode of procurement has had several disadvantages, however, among which may be mentioned the fact that stereoscopes, as heretofore made and known, have employed lenses so disposed as to require special focusing of the pictures with reference thereto and the consequent limiting of the size of the pictures to be examined. As is well known, the cards carrying pairs of stereographs are standardized to about 4 by 7 inches. Also, due to their principle of construction, it has been impossible to view through such stereoscopes, pictures at a distance of many feet or widely separated therefrom.

It is the object of my invention to produce an optical instrument which will overcome the difficulties and limitations of stereoscopes heretofore known, and particularly to produce an instrument which is capable of practical use with stereographs of practically an unlimited size and viewable from practically any desired distance or at any desired angle or simultaneously by many people. These stereographs may be of such a character, for example, as might be thrown upon a screen by a projection lantern in surgical amphitheatres or in connection with moving pictures. If each student, observer or visitor were supplied with one of my devices, all could see the pictures with ease and comfort and from any seat in the auditorium. Such an instrument would have great utility in the instruction or entertainment of large audiences, being of especial value in surgical demonstration, in X-ray work and in school and trade instruction and for purposes of general entertainment. It is another object of my invention to completely divorce the stereographs, themselves, from the instrument through which they are to be viewed so that the observer need not hold the picture as well as the instrument. Another of my objects is to avoid strain on the eyes through relieving them of the necessity of taking unaccustomed and difficult positions. Still another object is to produce an inexpensive, compact, light and readily held or carried stereoscopic instrument.

In carrying out my invention I employ an instrument readily held in the hand comprising a hood or casing which may be held against the forehead and in front of the eyes and carrying two partitions, in one of which are the prisms through which the stereographs are to be viewed and the other having one or more adjustable openings adapting the instrument to various size pictures, and to varying distances between the pictures and the observer. I have found it also useful to assist this adjustment of the individual to the conditions under which the pictures are viewed by making the distance between the two partitions adjustable, thus increasing the range of utility to any desired extent.

Figure 2:
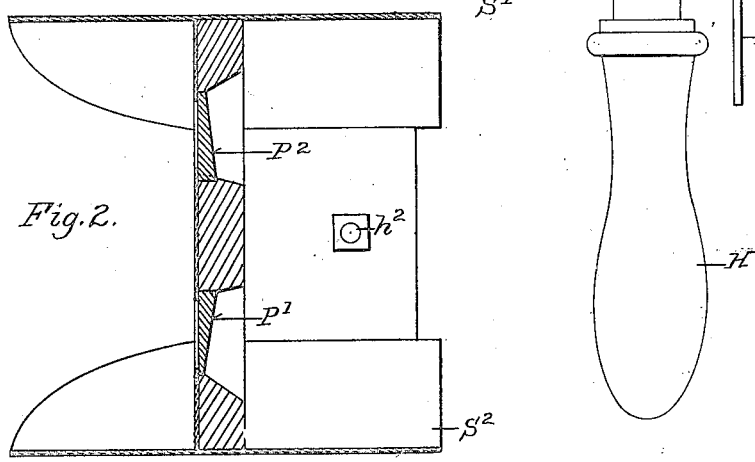
Figure 4:
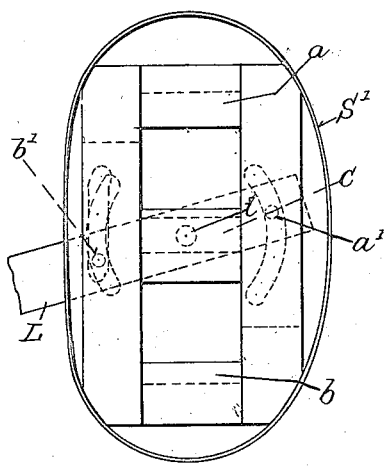
Figure 3:
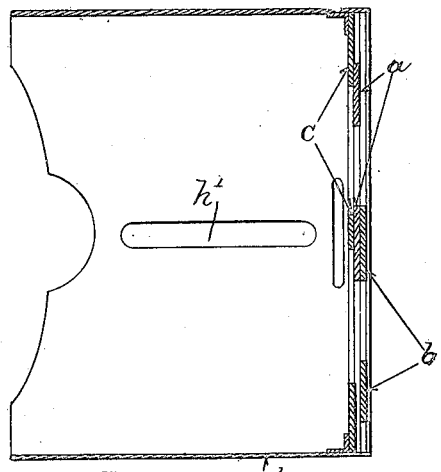

One embodiment of my invention is illustrated in simple manner in the accompanying drawings, in which Fig. 1 shows a side elevation of the apparatus, Fig. 2 shows a horizontal section through the front portion of the device and Fig. 3 a horizontal section through the rear portion; Fig. 4 is a rear end view showing a means for shifting the position of the openings in the rear partition and varying their size. Fig. 5 is a diagrammatic expression of the functional parts of the apparatus with reference to the eyes of the observer and the stereographs to be observed; in the various figures corresponding letters indicate corresponding parts.

As is well known to those skilled in this art the stereoscopes heretofore used are so arranged as to permit the right eye of the observer to view the righ-hand picture of the stereographs, while the left eye views the left-hand picture. As will be seen from Fig. 5, I have made the radical departure of designing a practical apparatus for viewing the left-hand picture with the right eye and viewing the right-hand picture with the left eye. The two prisms P¹ and P² are arranged as shown, with the result that the rays of light are refracted in the general manner shown in the figure. It is thus seen that the left-hand picture A is viewed by the right eye while the right-hand picture B is viewed by the left eye; all of the rays from the picture A, which normally would reach the left eye, are shut off from the left eye by the screen b, while all the rays from the picture B, which normally would reach the right eye, are shut off from the right eye by the screen a. By varying the distance Y between the partition carrying the prisms P¹ and P² and the partition carrying the screens a, b, while at the same time adjusting the transverse size and location of the opening or openings in the screens a, b it is possible to get a clearly defined joint or superposed view of the pictures A and B which will appear to the observer to occupy an intermediate position C in front of the actual position of the pictures A and B. It will be seen that the size of the pictures A and B is immaterial and their distance from the observer may be great or small provided the range of adjustment of the parts is such as to permit the desired views to reach the eye, while shutting out in whole or part, the undesired rays.

It is also apparent that the pictures, when taken through a stereoscopic camera, do not have to be cut and mechanically transposed when printed as with former stereoscopes, but assume their correct position naturally, due to the transposition afforded by the camera lens. This is what is meant by the expression "naturally disposed" in some of my claims.

Referring to the specific structure illustrated in Figs. 1 to 4 of the drawings, I provide a two-section casing supported upon a handle H. At the top of the handle H is a threaded pin h which passes through a slot h¹ in the bottom of the section S¹ of the casing and engages with a threaded hole h² in the bottom of the section S². By slightly unscrewing the handle H the sections S¹ and S² may be adjusted longitudinally with reference to each other so as to vary the distance between the partition carrying the prisms P¹ and P², and the partition carrying the screens a, b. The adjustment of the openings in the screens a, b is secured through the employment of the lever L, pivoted at i, in the stationary portion c of the screen and engaging with the movable parts a, b of the screen at points a', b'. By this construction it will be seen that a shifting of the lever L to one side or the other will cause the sections a, b of the screen to slide toward or away from each other laterally and thus bring the openings in this screen a, b closer to each other or wider apart, while their apparent size may be varied at the same time, by causing the stationary portion c of the screen, or projecting parts of the sliding portions a, b to overlap, and thus narrow the openings. The proportions of these openings and their precise location can readily be determined by designing or by trial.

Having thus described the preferred form of my invention and enunciated the principles upon which it operates, I do not wish to limit it to the precise details shown, provided the essential combinations of the appended claims are followed. For example, I do not wish to be limited absolutely to prisms having plane surfaces as a slight curvature of one surface or the other, or both, may be employed provided it is so small that the eye can adjust its focus without undue strain and without a special focusing of the apparatus.

Similarly the use of separate glasses or lenses of small curvature between the eye and the prisms, will not depart from the spirit of my invention; it therefore follows that the specific location of the prisms as illustrated in the drawings may be varied provided the claimed characteristics are present. Nor do I desire to be limited to the specific form and location of the screen for shutting out the undesired rays, as it is obvious that this feature is capable of modification in many ways without changing the essential mode of operation.

I claim as my invention:

1. In an optical instrument for securing the illusion of natural perspective with naturally disposed stereographic pictures, a casing adapted to be held before the eyes, a pair of prisms carried by the casing through which the stereographs are to be viewed, said prisms being so arranged as to throw the right-hand picture toward the left eye and the left-hand picture toward the right eye, and a screen between the prisms and the stereographs having a pair of openings of such a size and in such position as to permit the right eye to view the left-hand picture and the left eye to view the right-hand picture while the view of the right-hand picture by the right eye and the view of the left-hand picture by the left eye is shut off by the remaining portions of such screen.

2. In an optical instrument for securing the illusion of natural perspective with naturally disposed stereographic pictures, having a pair of prisms through which the stereographs are to be viewed, a casing with one partition in which the prisms are mounted and a second partition having a pair of openings of such size and in such position as to permit the right eye to view the left-hand picture and the left eye to view the right-hand picture while the view of the right-hand picture by the right eye and the view of the left-hand picture by the left eye is shut off by the remaining portions of such partition.

3. In an optical instrument for securing the illusion of natural perspective with stereographic pictures, a hood or casing having one partition which carries a pair of prisms through which the stereographs are to be viewed, and a second partition parallel to the first and between the prisms and the stereographs, such second partition being adjustable in position and having one or more adjustable openings.

4. In an optical instrument for securing the illusion of natural perspective with stereoscopic pictures, having a pair of prisms through which the stereographs are to be viewed, a two-part hood or casing, one part carrying the prisms and the other part having a screen in which are adjustable openings co-operating with the prisms, the two parts of the hood being adjustable with reference to each other, whereby stereoscopic pictures may be viewed from a distance.

5. In an optical instrument for securing the illusion of natural perspective with stereoscopic pictures to be viewed from a distance, having a pair of prisms through which the stereographs are to be viewed, a two-part hood or casing, one part carrying the prisms and adapted to be held before the eyes, the other part being adjustable with reference to the first and carrying a partition in which are one or more openings, together with means for varying the lateral position of such openings.

6. In an instrument for viewing stereoscopic pictures at a distance and adapted to be held in the hand of an observer, a two-part telescoping casing, one part of the casing carrying a pair of prisms and the other part bearing a screen made up of two superposed, laterally movable, perforated plates, in combination with a single lever having an operative connection to both plates whereby a movement of the lever causes a movement of the two plates in opposite directions.

In testimony whereof I have hereunto signed my name.

MAX GIRSDANSKY.